US008619885B2

(12) United States Patent
Fujii et al.

(10) Patent No.: US 8,619,885 B2
(45) Date of Patent: Dec. 31, 2013

(54) RADIO COMMUNICATION SYSTEM

(75) Inventors: Hiromasa Fujii, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 369 days.

(21) Appl. No.: 12/994,981

(22) PCT Filed: May 25, 2009

(86) PCT No.: PCT/JP2009/059541
§ 371 (c)(1),
(2), (4) Date: Mar. 1, 2011

(87) PCT Pub. No.: WO2009/145151
PCT Pub. Date: Dec. 3, 2009

(65) Prior Publication Data
US 2011/0182377 A1 Jul. 28, 2011

(30) Foreign Application Priority Data
May 28, 2008 (JP) ................. 2008-140193

(51) Int. Cl.
H04K 1/10 (2006.01)
(52) U.S. Cl.
USPC ....................................... 375/260
(58) Field of Classification Search
USPC .......... 375/259, 260, 262, 265, 267; 370/208, 370/210
See application file for complete search history.

(56) References Cited

U.S. PATENT DOCUMENTS

| 2004/0228283 A1* | 11/2004 | Naguib et al. ................. 370/252 |
| 2005/0201477 A1* | 9/2005 | Cho et al. ...................... 375/260 |
| 2006/0212133 A1* | 9/2006 | Damnjanovic et al. .......... 700/1 |
| 2008/0130615 A1* | 6/2008 | Kashiwagi et al. ........... 370/343 |

FOREIGN PATENT DOCUMENTS

| JP | 7 273733 | 10/1995 |
| JP | 11 215095 | 8/1999 |
| JP | 2006 287624 | 10/2006 |
| JP | 2007 282228 | 10/2007 |
| JP | 2008 177842 | 7/2008 |

OTHER PUBLICATIONS

International Search Report issued Jun. 23, 2009 in PCT/JP09/059541 filed May 25, 2009.

* cited by examiner

Primary Examiner — Young T. Tse
(74) Attorney, Agent, or Firm — Oblon, Spivak, McClelland, Maier & Neustadt, L.L.P.

(57) ABSTRACT

The second radio communication system selects one or more of the sub-carriers S21 to be used in accordance with a condition of the sub-carriers S11. The second radio communication system transmits a radio signal by using the sub-carriers S21 selected. In the selection of sub-carrier, the sub-carrier S21 located between the plurality of sub-carriers S11 radiated in the frequency band BW2.

9 Claims, 10 Drawing Sheets

RADIO COMMUNICATION SYSTEM

TECHNICAL FIELD

The present invention relates to a radio communication system including a first radio communication system configured to transmit and receive a radio signal by using multiple sub-carriers having a prescribed frequency spacing therebetween, and a second radio communication system configured to transmit and receive a radio signal in an adjacent frequency band by using multiple sub-carriers.

BACKGROUND ART

Various measures have been heretofore taken to prevent a radio communication system from interfering with an adjacent radio communication system using an adjacent frequency band.

In general, the frequency response of a radio signal to be transmitted in each of the radio communication systems is used to define a spectrum mask for transmission power. The radio communication systems each control the amount of out-of-band radiation to a value not exceeding the spectrum mask, thereby avoiding inter-system interference. However, this method principally is a measure against intermodulation distortion on the transmission side. Hence, it is difficult to sufficiently suppress the influence of intermodulation distortion on the reception side with this method. Moreover, defining too stringent spectrum mask results in an increase in the cost and size of devices constituting the radio communication systems, and is thus not favorable.

Further, a method of dynamically controlling inter-system interference is known (see Patent Literature 1, for example). This method takes into consideration of the influence of a dominant wave used in data transmission on another radio communication system. Note that, this method does not refer to the influence of spurious emission on another radio communication system.

PRIOR ART LITERATURE

Patent Literature

Patent Literature 1: Japanese Patent Application Publication No. 2007-282228 (pp. 5-6)

SUMMARY OF THE INVENTION

Meanwhile, in a radio communication system that employs a multi-carrier scheme in which multiple signals are transmitted in parallel by using multiple sub-carriers, such as OFDM, a high peak component sometimes occurs in transmission signals depending on a combination of the transmission signals. This often raises a problem of interference with another radio communication system due to the operation of a nonlinear device in its saturation region (spurious emission), the nonlinear device constituting a low-noise amplifier (LNA) or a mixer of a receiver.

The interference with another radio communication system presents a serious problem particularly when multiple noncontiguous frequency bands are used together instead of contiguous and wide frequency bands in order to achieve a fast communication speed.

The present invention has been therefore made in view of the foregoing circumstances. An objective of the present invention is to provide a radio communication system capable of effectively reducing interference with an adjacent radio communication system using an adjacent frequency band when employing a multi-carrier scheme.

To solve the above problem, the present invention has following features. The first feature of the present invention is summarized in that a radio communication system including a first radio communication system (radio communication system 100) configured to transmit and receive a radio signal (radio signal RS) in a prescribed frequency band (band BW1) by using a plurality of first sub-carriers (sub-carriers S11) having a prescribed frequency spacing therebetween, and a second radio communication system (radio communication system 2) configured to transmit and receive a radio signal (radio signal RS) in an adjacent frequency band (band BW2) adjacent to the prescribed frequency band by using a plurality of second sub-carriers (sub-carriers S21), wherein the second radio communication system includes a sub-carrier selection unit (sub-carrier selection unit 303) configured to select one or more of the second sub-carriers to be used in accordance with a condition of the first sub-carriers, and a transmission unit (radio unit 313) configured to transmit a radio signal by using the second sub-carriers selected by the sub-carrier selection unit, and the sub-carrier selection unit selects the second sub-carriers located between the plurality of first sub-carriers radiated in the adjacent frequency band.

According to the radio communication system described above, in the second radio communication system, the second sub-carriers located between the multiple first sub-carriers radiated in the adjacent frequency band are selected in accordance with the status of the first sub-carriers used by the first radio communication system.

This allows more effectively reducing interference with the radio communication system using the adjacent frequency band even when the radiation of a radio signal in the adjacent frequency band due to the operation of a nonlinear device in its saturation region occurs, i.e., the out-of-band radiation occurs.

The second feature of the present invention relates to the first feature of the present invention and summarized in that the first radio communication system includes a used sub-carrier determining unit (sub-carrier processing unit 303) configured to use one or more of the first sub-carriers satisfying $f+(NM+n)\times\Delta f$, where f represents a reference frequency in the prescribed frequency band, $\Delta f$ represents a spacing between the first sub-carriers, N and n each represent a certain natural number, and M represents an integer within such a range that $f+(NM+n)\times\Delta f$ falls within the prescribed frequency band, and the sub-carrier selection unit selects the second sub-carriers satisfying $f+(NM+m)\times\Delta f$, where m represents a positive integer other than n and smaller than N.

The third feature of the present invention relates to the second feature of the present invention and summarized in that the first radio communication system and the second radio communication system employ orthogonal frequency-division multiplexing.

The fourth feature of the present invention relates to the third feature of the present invention and summarized in that a symbol (symbol SY) associated with a plurality of bits is used in the first radio communication system and the second radio communication system, and a timing for transmitting the symbol in the first radio communication system and a timing for transmitting the symbol in the second radio communication system are synchronized.

The fifth feature of the present invention relates to the second feature of the present invention and summarized in that N satisfies $N\geq 2$, the sub-carrier selection unit selects sets of the second sub-carriers meeting a plurality of values of m, and the transmission unit transmits a radio signal by using the sets of second sub-carriers selected by the sub-carrier selection unit.

The sixth feature of the present invention relates to the second feature of the present invention and summarized in that a transmission frame (transmission frame F) to be transmitted in the first radio communication system is divided into a plurality of time domains (time slots TS1 and TS2) along a time axis, and in each of the first radio communication system and the second radio communication system, the value of N is different for each of the time domains.

The seventh feature of the present invention relates to the second feature of the present invention and summarized in that the first radio communication system includes a condition acquiring unit (network connecting unit 315 for example) configured to acquire an operating condition of the second radio communication system, and the used sub-carrier determining unit determines N on the basis of the operating condition acquired by the condition acquiring unit.

The eighth feature of the present invention relates to the seventh feature of the present invention and summarized in that the condition acquiring unit includes propagation loss between a transmitter and a receiver included in the second radio communication system.

The ninth feature of the present invention relates to the seventh feature of the present invention and summarized in that the used sub-carrier determining unit determines N and n on the basis of a bandwidth of the prescribed frequency band used in the first radio communication system.

According to the features of the present invention, it is capable of providing a radio communication system effectively reducing interference with an adjacent radio communication system using an adjacent frequency band when employing a multi-carrier scheme.

MODES FOR CARRYING OUT THE INVENTION

Figure 1:
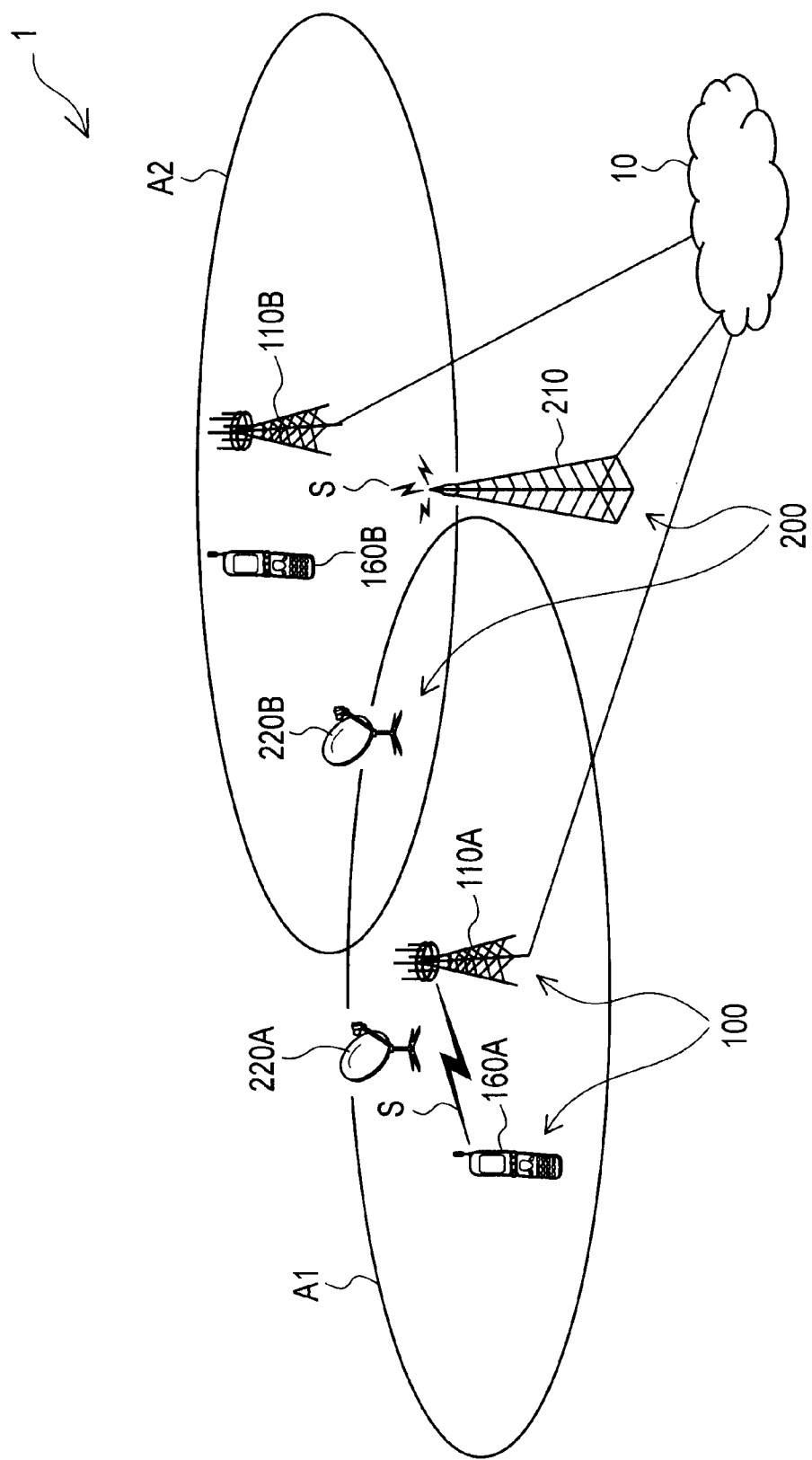
FIG. 1 is a diagram showing a schematic configuration of an entire radio communication system 1 according to a first embodiment of the present invention.

Next, embodiments of the present invention are described. Specifically, first to sixth embodiments are described.

Note that, in the following description of the drawings, the same or similar parts are denoted by the same or similar reference numerals. However, it should be noted that the drawings are conceptual and ratios of respective dimensions and the like are different from actual ones.

Therefore, specific dimensions and the like should be determined by taking into consideration the following description. Moreover, as a matter of course, also among the drawings, there are included portions in which dimensional relationships and ratios are different from each other.

First Embodiment

First of all, the first embodiment of the present invention is described. Specifically, description is provided for (1) Schematic Configuration of Entire Radio Communication System, (2) Schematic Operation of Radio Communication System, (3) Configuration of Functional Blocks of Radio Communication System, (4) Modification, and (5) Advantageous Effects.

(1) Schematic Configuration of Entire Radio Communication System

FIG. 1 is a diagram showing a schematic configuration of an entire radio communication system 1 according to this embodiment. As shown in FIG. 1, the radio communication system 1 includes a radio communication system 100 and a radio communication system 200.

The radio communication system 100 includes radio base stations 110A and 110B and radio communication terminals 160A and 160B. The radio communication terminals 160A and 160B are mobile radio communication terminals. In this embodiment, the radio communication system 100 is a mobile phone system, and constitutes a first radio communication system.

The radio communication system 200 includes a transmitter station 210 and receivers 220A and 220B. The receivers 220A and 220B are placed in certain positions, and receive a radio signal RS transmitted from the transmitter station 210. In this embodiment, the radio communication system 200 is a broadcast system, and constitutes a second radio communication system.

The radio base stations 110A and 110B transmit radio signals RS toward the radio communication terminals 160A and 160B. The radio base station 110A forms a cover area A1, and the radio base station 110B forms a cover area A2. In other words, the radio communication system 100 is a multi-cell radio communication system including multiple cells (radio base stations).

The radio communication system 100 and the radio communication system 200 employ orthogonal frequency-division multiplexing (OFDM). The radio communication system 100 and the radio communication system 200 are connected to each other via a communication network 10.

(2) Schematic Operation of Radio Communication System

Figure 2:
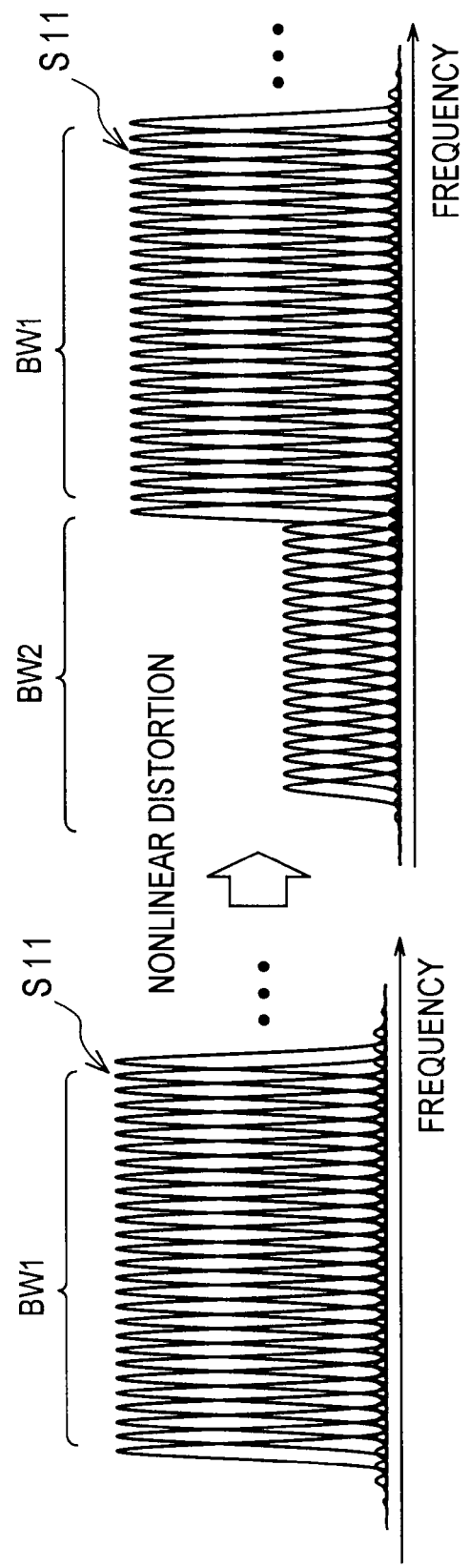
FIG. 2 is an example showing how sub-carriers are arranged in a frequency band in which a radio communication system 100 performs transmission, according to the first embodiment of the present invention.

Next, a schematic operation of the radio communication system 1 is described. FIG. 2 is an example showing how sub-carriers are arranged in a frequency band in which the radio communication system 100 performs transmission.

The radio communication system 100 transmits and receives a radio signal RS in a band BW1 (prescribed frequency band) by using multiple sub-carriers S11 (first sub-carriers) having a prescribed frequency spacing therebetween.

The radio communication system 200 transmits and receives a radio signal RS by using multiple sub-carriers S21 (second sub-carriers) in a band BW2 adjacent to the band BW1 (adjacent frequency band).

Figure 4:
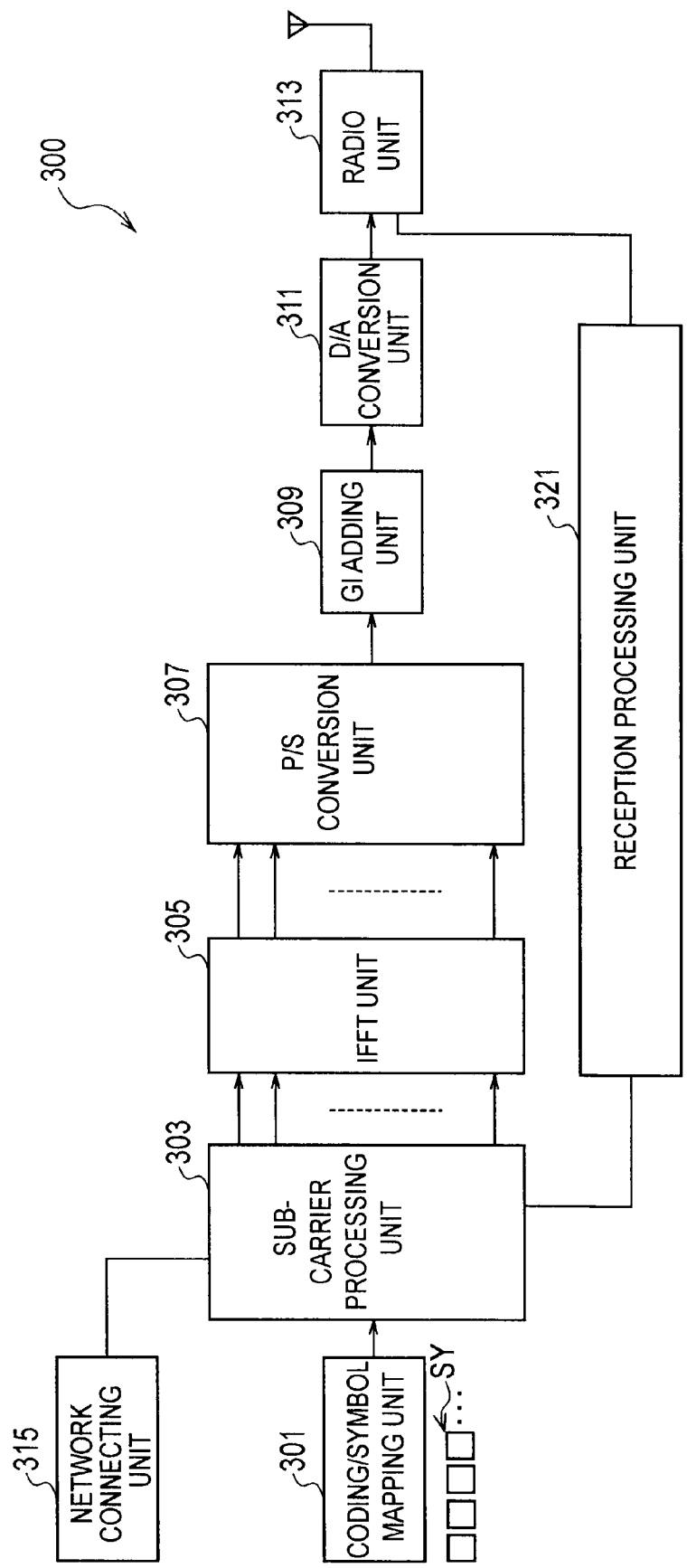
FIG. 4 is a diagram showing the configuration of functional blocks of a radio communication device 300 according to the first embodiment of the present invention.

Since the radio communication system 100 and the radio communication system 200 employ OFDM, a high peak component can occur in a time signal, more specifically, an output signal of an IFFT unit 305 (see FIG. 4), depending on combinations of transmitted symbols SY (unillustrated in FIG. 2, see FIG. 4).

When the peak component is received by a nonlinear device constituting a radio unit 313 (see FIG. 4), such as a power amplifier, this causes distortion (nonlinear distortion) of the signal, which in turn results in an increase in the amount of out-of-band radiation in the band BW2 adjacent to the band BW1. As shown in FIG. 2, if all the sub-carriers S11 are used, spurious waves are generated also at a frequency spacing ($\Delta f$) for all the sub-carriers S11 outside the band BW1, i.e., in the band BW2.

In this embodiment, the sub-carriers S11 are used at a spacing of two sub-carriers. In this case, spurious waves, which are generated in the band BW2 by a signal with a spacing of two sub-carriers passing through the nonlinear device operating under saturation conditions, are generated also at a spacing of $2\times\Delta f$.

Figure 3:
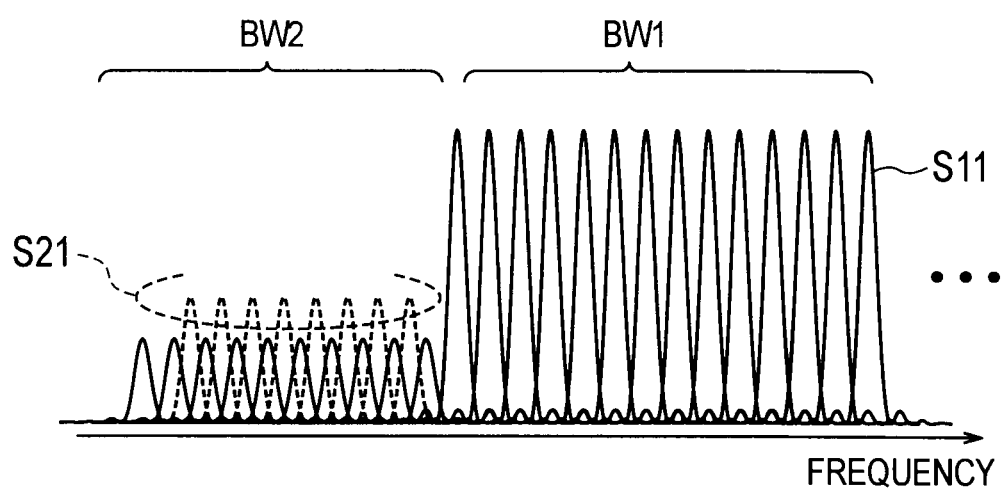
FIG. 3 is an example showing how sub-carriers are arranged in the case where a spacing between sub-carriers is 2×Δf, according to the first embodiment of the present invention.

FIG. 3 is an example showing how sub-carriers are arranged with a spacing between sub-carriers of $2\times\Delta f$. Assuming that the frequency of spurious waves (sub-carriers S11) generated by the radio communication system 100 is $f+2n\times\Delta f$, the radio communication system 200 using the band BW2 performs communications by using sub-carriers S21 with a frequency of $f+(2n+1)\times\Delta f$. Here, f represents a reference frequency, $\Delta f$ represents a spacing between sub-carriers, n represents an integer which corresponds to sub-carriers in both of the bands (band BW1 and band BW2) and which falls within such a range that $f+2n\times\Delta f$ and $f+(2n+1)\times\Delta f$ fall within the respective frequency bands (band BW1 and band BW2).

It should be noted that, sub-carrier numbers to be used may be set to fixed values on the basis of the result of adjustment in the radio communication system 100 and the radio communication system 200. Further, the radio communication terminals 160A and 160B constituting the radio communication system 100 may determine their usable sub-carriers, and numbers of the sub-carriers thus determined may be notified to the radio communication system 200. Also, the radio communication system 200 (receivers 220A and 220B) may transmit a radio signal RS by using the set of (or part of the set of) sub-carriers thus notified.

In this embodiment, the radio communication system 100 and the radio communication system 200 use the same spacing between sub-carriers ($\Delta f$). Note that the radio communication system 200 may perform single-carrier communication using a band equivalent to one sub-carrier.

Further, in this embodiment, the timing for transmitting symbols SY in the first radio communication system 100 and the timing for transmitting the symbols SY in the second radio communication system 200 are synchronized.

(3) Configuration of Functional Blocks of Radio Communication System

Next, description is given of the configuration of functional blocks of the radio communication system 1. Specifically, description is given of the configuration of functional blocks of a radio communication device 300 mounted either in each of the radio base stations 110A and 110B constituting the radio communication system 1 or in the transmitter station 210 constituting the radio communication system 200.

(3.1) In Case of Mounting in Transmitter Station 210

First, description is given of the case where the radio communication device 300 is mounted in the transmitter station 210. FIG. 4 is a diagram showing the configuration of the functional blocks of the radio communication device 300. The radio communication device 300 functions to transmit a radio signal RS. To be more specific, the radio communication device 300 includes a coding/symbol mapping unit 301, a sub-carrier processing unit 303, an IFFT unit 305, a P/S conversion unit 307, a GI adding unit 309, a D/A conversion unit 311, a radio unit 313, and a network connecting unit 315.

The coding/symbol mapping unit 301 codes, with an error correction code, a transmission bit array transmitted. The coding/symbol mapping unit 301 also performs mapping to symbols SY each associated with multiple bits (for example, 0001).

The sub-carrier processing unit 303 allocates sub-carriers to the symbols SY outputted from the coding/symbol mapping unit 301. In this embodiment, in particular, the sub-carrier processing unit 303 selects one or more sub-carriers S21 to be used in accordance with the status of the sub-carriers S11 used by the radio communication system 100. When the radio communication device 300 is mounted in the transmitter station 210, the sub-carrier processing unit 303 constitutes a sub-carrier selection unit.

To be more specific, the sub-carrier processing unit 303 selects sub-carriers S21 located between the multiple sub-carriers S11 radiated in the band BW2. In this embodiment, the sub-carrier processing unit 303 selects sub-carriers S21 satisfying $f+(NM+m)\times\Delta f$.

Here, N represents the spacing between sub-carriers to be used, and is a natural number previously defined (predetermined natural number). N satisfies $N\geq 2$. For example, in the case of N=2, every second sub-carrier is used; more specifically, sub-carriers #1, 3, 5 . . . are used.

M represents an integer within such a range that $f+(NM+n)\times\Delta f$ to be described later falls within the band BW1. m represents a positive integer other than n and smaller than N.

In addition, the sub-carrier processing unit 303 can select sets of sub-carriers S21 meeting multiple integers m. In the selection of the sets of sub-carriers S21 meeting multiple integers m, not only N but also m needs to be determined. For example, if the sub-carriers #1, 3, and 5 are used and if the frequency of the sub-carrier #0 is f, m=1 is determined.

The IFFT unit 305 carries out inverse Fourier transform on the sub-carriers S21 outputted from the sub-carrier processing unit 303, and generates a time signal for the outputted sub-carriers S21.

The P/S conversion unit 307 carries out parallel-serial conversion on the time signal outputted from the IFFT unit 305.

To the time signal outputted from the P/S conversion unit 307, the GI adding unit 309 adds a guard interval, more specifically part of the time signal.

The D/A conversion unit 311 carries out digital/analog conversion on the time signal having the guard interval inserted thereto.

The radio unit 313 carries out frequency conversion and power amplification on the signal outputted from the D/A conversion unit 311. The radio unit 313 also transmits, through an antenna, a radio signal RS generated by the execution of the frequency conversion and the power amplification.

In other words, the radio unit 313 transmits the radio signal RS by using the sub-carriers S21 selected by the sub-carrier processing unit 303. The multiple sub-carriers S21 are transmitted in parallel, and each symbol SY is transmitted on any one of the sub-carriers S21.

When the sub-carrier processing unit 303 selects the sets of sub-carriers S21 meeting multiple integers m, the radio unit 313 can transmit a radio signal RS using the selected sets of sub-carriers S21.

The network connecting unit 315 provides a communication interface for connection with the communication network 10 (see FIG. 1). The network connecting unit 315 is connected to the sub-carrier processing unit 303, and transmits and receives, to and from the sub-carrier processing unit 303, information on the status of the sub-carriers being used by the radio communication system 100 and the radio communication system 200.

(3.2) In Case of Mounting in Radio Base Stations 110A and 110B

In the case where the radio communication device 300 is mounted in the radio base stations 110A and 110B, the radio communication device 300 provides functions to be described below. Note that, hereinbelow, description is given of parts different from the above case where the radio communication device 300 is mounted in the transmitter station 210.

In this embodiment, in the radio communication system 100 including the radio base stations 110A and 110B, the sub-carriers S11 satisfy f+(NM+n)×Δf. As described above, f represents a reference frequency in the band BW1. N and n each represent a predetermined natural number. M represents an integer within such a range that f+(NM+n)×Δf falls within the band BW1. When the radio communication device 300 is mounted in the radio base stations 110A and 110B, the sub-carrier processing unit 303 constitutes a used sub-carrier determining unit.

The sub-carrier processing unit 303 determines N on the basis of the operating condition of the radio communication system 100 acquired by the network connecting unit 315. Alternatively, the sub-carrier processing unit 303 may determine N and n on the basis of the bandwidth of the band BW1 used by the radio communication system 100.

To be more specific, when the radio communication system 200 is in low operating condition, N=3 is set, and the radio communication system 100 uses a set of sub-carriers S11 meeting one integer m. N and m are determined to be changed from "N=2, the radio communication system 100 uses the set of sub-carriers S11 meeting one integer m" to "N=3, the radio communication system 100 uses sets of sub-carriers S11 meeting two integers m," as the operation rate of the radio communication system 200 increases.

The description has been given above of the method of determining the set of sub-carriers S11 to be used by the radio communication system 100 in accordance with the operating condition of the radio communication system 200. However, the radio communication system 100 may determine N and m on the basis not of the operating condition of the radio communication system 200 but of a certain condition, e.g., to "select a set of N and m making the resource usage rate of each radio base station equal to or smaller than X %," according to the traffic state of the radio communication system 100. The radio communication system 200 may select a set of sub-carriers S21 to be used in accordance with the usage of the adjacent sub-carriers S11.

The network connecting unit 315 acquires the operating condition of the radio communication system 200. To be more specific, the network connecting unit 315 acquires information on the usage of the sub-carriers S21, from the transmitter station 210 connected thereto via the communication network 10. The network connecting unit 315 notifies the sub-carrier processing unit 303 of the acquired information. When the radio communication device 300 is mounted in the radio base stations 110A and 110B, the network connecting unit 315 constitutes a condition acquiring unit.

The network connecting unit 315 may also acquire information on propagation loss between the transmitter and each receiver included in the radio communication system 200, i.e., between the transmitter station 210 and each of the receivers 220A and 220B.

(4) Modification

The above embodiment has been given taking as an example the case where the amount of out-of-band radiation is constant independent of time, the radio base stations 110A and 110B, and the like. However, if there are no receivers 220A and 220B of the radio communication system 200, which use the band BW2 adjacent to the band BW1, in an area adjacent to the radio base stations 110A and 110B of the radio communication system 100, a larger amount of out-of-band radiation is allowed than in the case where such receivers exist in the area.

Hence, when feedback information can be obtained from the radio communication system 200 using the band BW2 or when the status (such as the location and the amount of attenuation with distance) of a receiver of the radio communication system 200 using the band BW2 is acquired, the radio base stations 110A and 110B may control the amount of spurious waves to be transmitted outside the band, in accordance with the status of the radio communication system 200 using the band BW2.

For example, in FIG. 1, when the receivers 220A and 220B of the radio communication system 200 using the band BW2 are in operation, the radio base stations 110A and 110B use the sub-carriers S11 with a spacing of two sub-carriers being maintained between them, that is, with the number of sub-carriers to be used being reduced. On the other hand, if merely one of the radio communication terminals is in operation, the radio base stations 110A and 110B may use all the sub-carriers S11.

In this case, for example, the receivers 220A and 220B may notify the radio communication system 100 of the location information and operating condition of the receivers 220A and 220B. Here, the receivers 220A and 220B may notify the radio communication system 100 not of the operating condition thereof but of the amount of interference caused by a radio signal RS transmitted from the transmitter station 210, the estimated propagation loss between the transmitter station 210 and each of the receivers 220A and 220B, and the amount of interference power reduction required.

Note that, the estimated propagation loss may include the influence of the transmission antenna gain and the reception antenna gain. Also, the allowable interference level, which is set in accordance with the reception level of desired waves in the receivers 220A and 220B, may be notified together.

Further, on the basis of these sets of information thus notified, the radio base stations 110A and 110B may determine N, m, and the transmission power so that the influence on the receivers 220A and 220B may be equal to or less than the allowable level.

(5) Advantageous Effects

Figure 5:
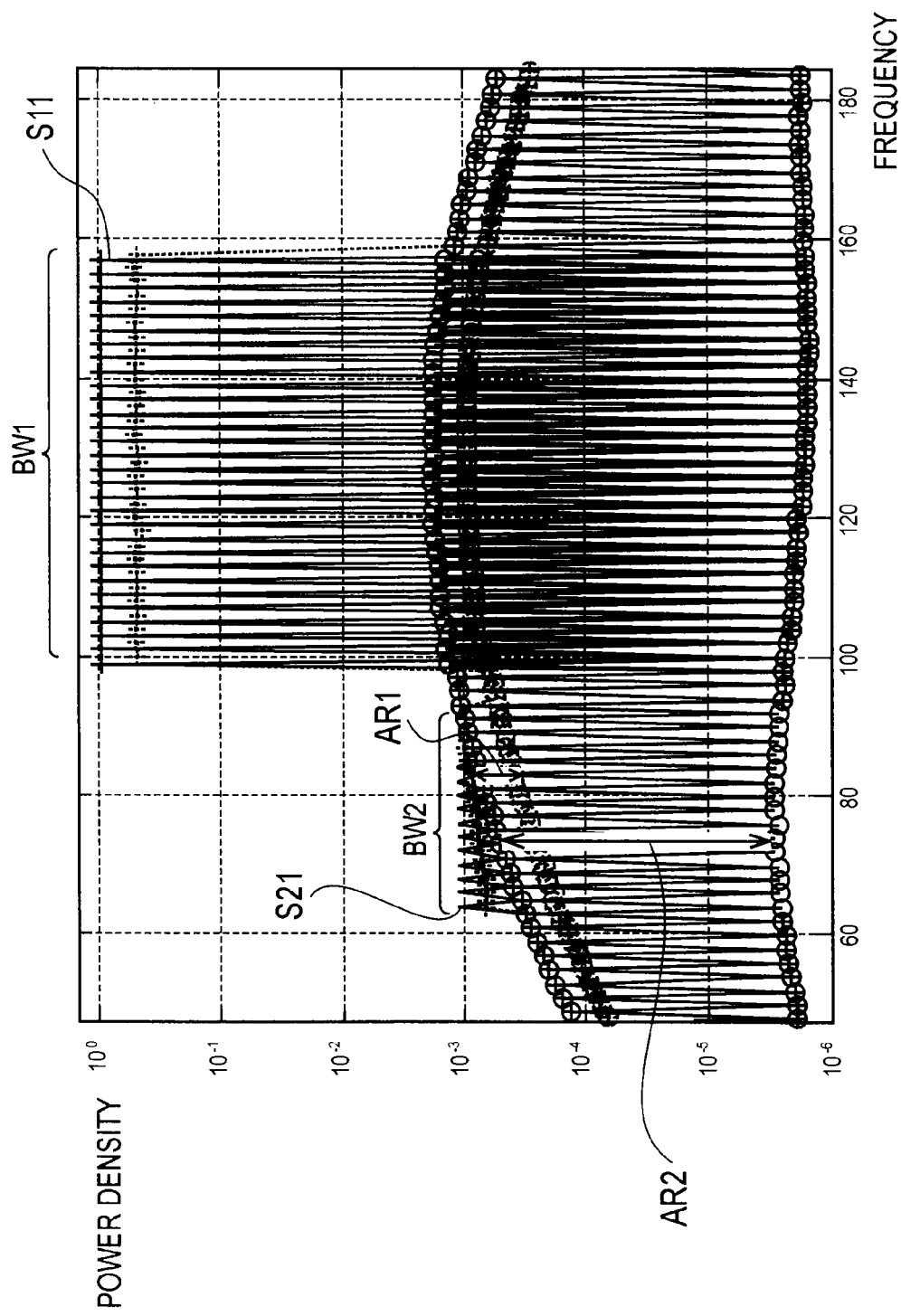
FIG. 5 is a diagram showing a simulation result as to the status of sub-carriers in frequency bands according to the first embodiment of the present invention.

Next, description is given of the result of computational simulation conducted to confirm the effect of the radio communication system 1. FIG. 5 shows the simulation result as to the status of sub-carriers in frequency bands.

The computational simulation was conducted under the following conditions.

The number of FFT points for monitoring: 256

The total number of sub-carriers in the band occupied by the radio communication system 100: 30

The number of sub-carriers used by the radio communication system 100: 15

The total number of sub-carriers in the band occupied by the radio communication system 200: 60

The number of sub-carriers used by the radio communication system 200: 30

Back-off: 3.5 dB

In the case where the sub-carriers S11 are randomly used in the band BW1, spurious waves of a relatively high level occur at all the frequency components in the band BW2 adjacent to the band BW1. AR1 in the drawing indicates SIR measured when the sub-carriers S11 are randomly used in the band BW1.

In the case of this embodiment, on the other hand, the level of spurious waves is reduced at positions of sub-carriers used by the radio communication system 200 in the band BW2. AR2 in the drawing indicates SIR measured when the sub-carriers S11 and the sub-carriers S21 are used according to the method mentioned above.

As described above, according to this embodiment, even when a radio signal RS of high power density is received in the band BW2 from the radio communication system 100, the interference by the sub-carriers S11 can be reduced in the radio communication system 200, which allows securing favorable reception quality.

Note that, the method of sub-carrier allocation according to this embodiment is characterized by being advantageous in terms not only of the transmission spurious emission occurring on the transmission side but also of the reception intermodulation occurring on the reception side.

Unlike against the transmission spurious emission, it is conventionally difficult to take measures on the transmission side to suppress the reception intermodulation. Thus, only limited methods are applicable, such as increasing guard bands and reducing transmission power.

Further, processing for the compensation of a radio signal RS once distorted is complicated and difficult. However, with the sub-carrier allocation method according to this embodiment, even when a radio signal RS is distorted on the reception side, the interference between the radio communication system 100 and the radio communication system 200 can be prevented without complicated processing on the reception side since the frequency component being distorted differs from the frequency component of a modulated signal.

Further, in the case of a multi-cell radio communication system such as the radio communication system 100, the radio base stations 110A and 110B use different sub-carriers in the same frequency band, which allows reducing the inter-cell interference and effectively using large radio resources as a whole.

Here, when multiple sub-carrier position patterns are used by the radio communication system 100, different patterns are used for the respective radio base stations 110A and 110B. For this reason, a situation can occur in which the receivers 220A and 220B of the radio communication system 200 receive the multiple sub-carrier position patterns, i.e., all the sub-carriers. Accordingly, the problem due to the reception intermodulation may not be solved.

Meanwhile, the problem to be solved in this embodiment is likely to occur in the case where a receiver exists in a position adjacent to the radio base station 110A, like the receiver 220A does. However, when the radio communication system 100 is deployed in a planar orientation like a multi-cell radio communication system, multiple radio base stations are generally not arranged adjacently. For this reason, the level at which the receiver 220A receives a radio signal RS transmitted from the radio base station 110B is relatively low. Accordingly, smaller spurious waves are generated due to the reception intermodulation, which rarely causes the generation of reception intermodulation large enough to disturb communication.

On the other hand, it is considered that the receiver 220B, which receives radio signals RS transmitted from the radio base stations 110A and 110B at the same level, receives radio signals RS from the radio base stations 110A and 110B at a level lower than that of the receiver 220A. Thus, it is considered that this embodiment also allows effectively reducing spurious waves generated due to the reception intermodulation.

In sum, according to the radio communication system 1, the radio communication system 200 selects sub-carriers S21 located between multiple sub-carriers S11 radiated in the band BW2 in accordance with the status of the sub-carriers S11 used by the radio communication system 100.

Specifically, the radio communication system 100 selects sub-carriers S11 satisfying $f+(NM+n)\times\Delta f$; the radio communication system 200 selects sub-carriers S21 satisfying $f+(NM+m)\times\Delta f$. Here, m represents a positive integer other than n and smaller than N. Alternatively, the radio communication system 200 may determine a set of sub-carriers S21 which would not affect the radio communication system 100, in accordance with "the usage of the radio communication system 200" and "the influence of the radio communication system 100 on the radio communication system 200."

In this way, the interference between the radio communication system 100 and the radio communication system 200 using the band BW2 can be more effectively reduced even when the radiation of a radio signal RS in the band BW2 due to the operation of a nonlinear device in its saturation region occurs, that is, the out-of-band radiation occurs in the radio communication system 100.

In this embodiment, the timing for transmitting symbols SY in the radio communication system 100 and the timing for transmitting the symbols SY in the radio communication system 200 are synchronized. This suppresses the amount of out-of-band radiation due to the discontinuity of symbols SY. If symbols SY are operated asynchronously in the radio communication system 100 and the radio communication system 200, the sub-carrier allocation method described above is effective only in a situation where the amount of out-of-band radiation due to the distortion in a nonlinear device is larger than the amount of out-of-band radiation due to the discontinuity of symbols SY.

In this embodiment, the radio communication system 100 (sub-carrier processing unit 303) determines N on the basis of the operating condition of the radio communication system 200 acquired via the communication network 10. This allows more effectively using radio resources in the radio communication system 100 and the radio communication system 200 while suppressing the interference between the radio communication system 100 and the radio communication system 200 due to an increase in the amount of out-of-band radiation.

Second Embodiment

Next, the second embodiment of the present invention is described. In this embodiment, multiple sub-carrier arrangement patterns are used. Hereinbelow, description is given mainly of parts different from the first embodiment described above.

In the first embodiment, description has been given taking as an example the case where the radio communication system 100 uses sub-carriers S11 with a spacing of two sub-carriers (N=2) being maintained between them. In this embodiment, description is given taking as an example the case of N=3.

Figure 6:
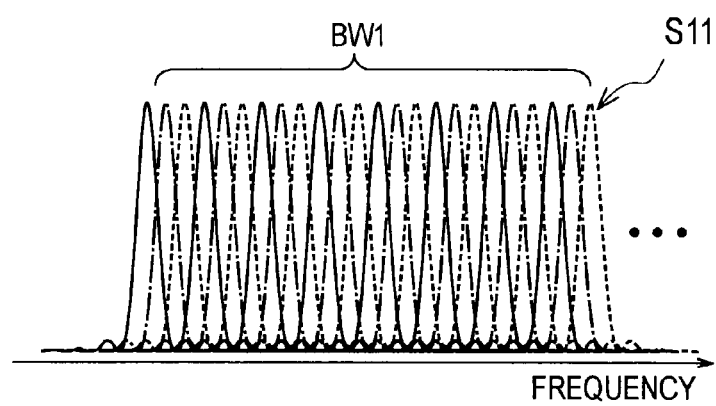
FIG. 6 is a diagram showing an example of how sub-carriers S11 are arranged in a band BW1 that the radio communication system 100 can use, according to a second embodiment of the present invention.

FIG. 6 is an example showing how sub-carriers S11 are arranged in the band BW1 that the radio communication system 100 can use. In the case of N=3, the radio communication system 100 uses only sub-carriers S11 shown by the solid line out of the sub-carriers S11 shown in FIG. 6.

Figure 7:
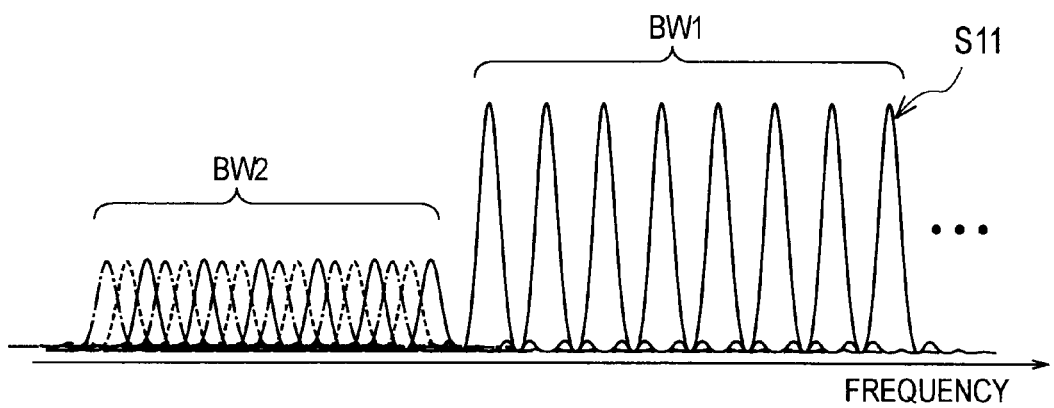
FIG. 7 is a diagram showing an example of the sub-carriers S11 in the band BW1 and spurious waves caused by radiation of the sub-carriers S11 in the band BW2, according to the second embodiment of the present invention.

Here, FIG. 7 shows an example of the sub-carriers S11 in the band BW1 and spurious waves caused by radiation of the sub-carriers S11 in the band BW2. As shown in FIG. 7, in the case of N=3, spurious waves are generated at a spacing of 3×Δf even outside the band BW1, more specifically, in the band BW2. For this reason, the radio communication system 200 using the band BW2 uses one of sub-carrier arrangement patterns shown by the dotted line and the dashed-dotted line. Alternatively, the radio communication system 200 may use both the sub-carrier arrangement patterns shown by the dotted line and the dashed-dotted line.

In the case where a single frequency is repeatedly used in locations geographically apart from each other, like in the case of the multi-cell radio communication system 100, it is preferable that adjacent radio base stations use a single value as the above-mentioned spacing between sub-carriers, and that the adjacent radio base stations use different sub-carrier arrangement patterns. The use of such sub-carrier arrangement patterns allows preventing hindering the effective use of radio resources due to the presence of a sub-carrier not used at all in a specific area or the use of the same sub-carrier in adjacent radio base stations, for example.

Further, a spacing between sub-carriers S11 set in the radio communication system 100 may be shared via the communication network 10. For example, the radio communication terminals 160A and 160B can measure the sub-carriers S11 used by the radio communication system 100, and notify the radio base stations 110A and 110B of the measurement result. In this case, the radio communication device 300 has only to include a reception processing unit 321 (see FIG. 1) which receives the measurement result notified from the radio base stations 110A and 110B. Note that, the radio base stations 110A and 110B may be set not to send radio signals RS when the radio communication terminals 160A and 160B measure the sub-carriers S11 used by the radio communication system 100.

Third Embodiment

Next, the third embodiment of the present invention is described. In this embodiment, description is given of an example where a transmission frame of sub-carriers is divided into time domains and where a sub-carrier usage pattern is changed on a per time-domain basis.

Figure 8:
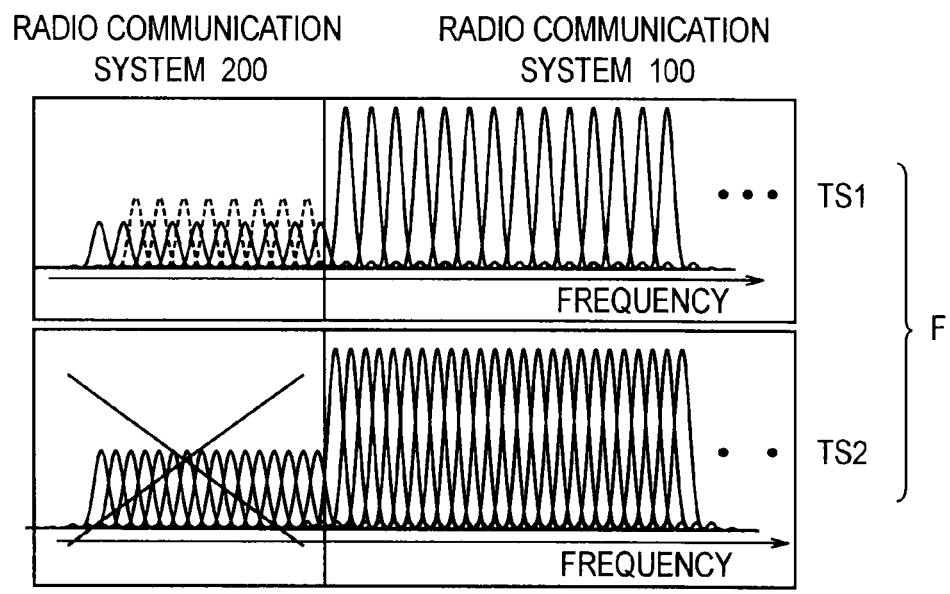
FIG. 8 is a diagram showing an example of how sub-carriers are arranged in the case where a transmission frame F is divided into time domains, according to a third embodiment of the present invention.

FIG. 8 is an example showing how sub-carriers are arranged in the case where a transmission frame F is divided into time domains. As shown in FIG. 8, the transmission frame F to be transmitted in the radio communication system 200 is divided into multiple time domains along the time axis, more specifically, into time slots TS1 and TS2.

As shown in FIG. 8, the radio communication system 100 transmits sub-carriers in the time slot TS1 by using a certain sub-carrier arrangement pattern (N=3, for example). In the time slot TS1, the radio communication system 200 may use sub-carriers which do not overlap spurious waves caused by out-of-band radiation from the radio communication system 100 (sub-carriers shown by the dotted line in FIG. 8). In other words, in each of the radio communication system 100 and the radio communication system 200, the value N (spacing between sub-carriers) described above is different for each time slot.

On the other hand, the radio communication system 100 transmits all the sub-carriers in the time slot TS2. For this reason, spurious waves caused by out-of-band radiation from the radio communication system 100 exist in the band used by the radio communication system 200. Thus, the receivers 220A and 220B sometimes fail to receive radio signals RS transmitted by the transmitter station 210 properly.

Note that, when the radio communication system 200 is not a broadcast system but a communication system executing communication in one-to-one correspondence, such as a radio LAN system, a receiver receiving large interference from the radio communication system 100 may use only sub-carriers shown by the dotted line in FIG. 8.

Further, when the radio communication system 200 is not a broadcast system but a mobile phone system, the sub-carriers shown by the dotted line in FIG. 8 may be allocated to a broadcast signal or a receiver receiving large interference from the radio communication system 100. On the other hand, sub-carriers shown by the solid line in FIG. 8 are preferably allocated to a receiver receiving small interference from the radio communication system 100.

Note that, as a method of determining the length of time slots, any one of (i) use of a value fixed in advance, (ii) determination based on the operating condition of the radio communication system 200, and (iii) determination based on the operating condition of the radio communication system 100, may be employed. When the length of time slots is determined on the basis of the operating condition of the radio communication system 200, the radio communication system 200 notifies the radio communication system 100 of the operating condition. Further, a combination of the length of time slots and a sub-carrier arrangement pattern may be changed on the basis of the above operating condition.

Fourth Embodiment

Next, the fourth embodiment of the present invention is described. In this embodiment, the frequency band that the radio communication system 1 can use is divided into multiple consecutive bands (sub-bands). The sub-carrier allocation described above is carried out on a specific sub-band.

Figure 9:
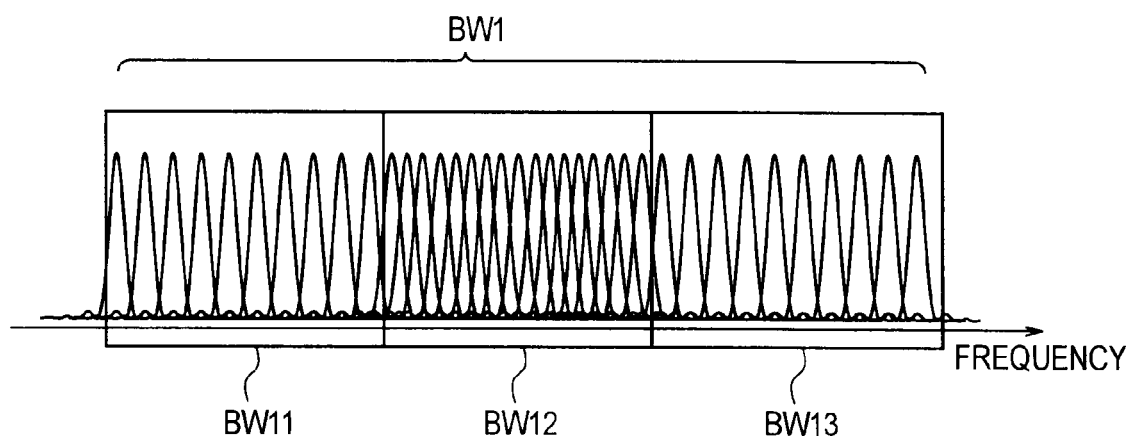
FIG. 9 is a diagram showing an example of how sub-carriers are arranged in the case where the band BW1 is divided into sub-bands BW11 to BW13, according to a fourth embodiment of the present invention.

FIG. 9 is an example showing how sub-carriers are arranged in the case where the band BW1 is divided into sub-bands BW11 to BW13. As shown in FIG. 9, the sub-carrier allocation is carried out so that the spacing of multiple sub-carriers (N sub-carriers) described above may be reserved only in the sub-bands located at outer sides among the sub-bands BW11 to BW13, i.e., the sub-band BW11 and the sub-band BW13.

Note that, in the sub-band BW12 not directly adjacent to frequency bands used by other radio communication systems, the spacing of multiple sub-carriers is not reserved. Instead, all the sub-carriers may be used, or specific sub-carriers may be used in a pseudo-random manner.

Fifth Embodiment

Next, the fifth embodiment of the present invention is described. As mentioned above, the radio communication system 200 and the radio communication system 100 employ OFDM. For this reason, in a mobile communication system such as the radio communication system 100, there are cases where signals are transmitted to multiple users (radio communication terminals) in the downlink by using the same symbol SY, and where the multiple users transmit signals by using the same symbol SY.

Figure 10:
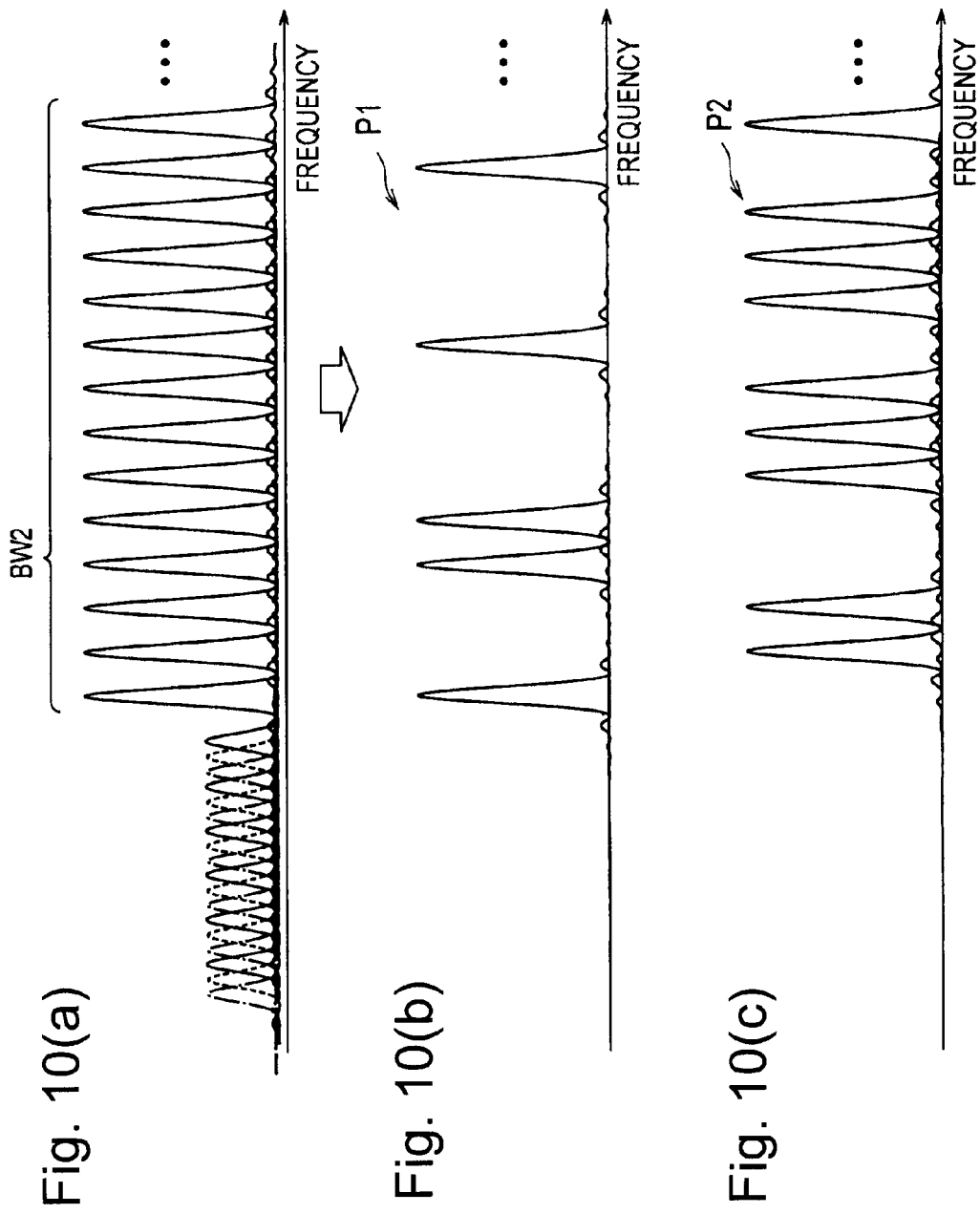
FIGS. 10(a)-10(c) are diagrams showing an example of how sub-carriers allocated to each user are arranged, according to a fifth embodiment of the present invention.

FIGS. 10(*a*) to 10(*c*) are an example showing how sub-carriers allocated to each user are arranged. As shown in FIGS. 10(*a*) to 10(*c*), out of the band BW2 that the radio communication system 100 can use, a user 1 is assigned sub-carriers based on a sub-carrier pattern P1 (see FIG. 10(*b*)); a user 2 is assigned sub-carriers based on a sub-carrier pattern P2 (see FIG. 10(*c*)).

Here, the sub-carrier patterns P1 and P2 can be determined on the basis of sub-carriers selected in a pseudo-random manner or of a certain number of consecutive sub-carriers.

Sixth Embodiment

Next, the sixth embodiment of the present invention is described. In this embodiment, a technique of reducing Peak to Average Power Ratio (PAPR) and the sub-carrier allocation method described above are combined.

In the use of OFDM, clipping and filtering is known as a method of reducing the level of peak parts generated in a transmission radio signal. According to the clipping and filtering, clipping noise is generated by the clipping of peak parts of an OFDM signal.

For example, the following method is conventionally known as a method of controlling clipping noise in a frequency region.

(i) Changing the level of allowable clipping noise between that outside the frequency band and that within the frequency band.

(ii) Changing the level of allowable clipping noise between that for sub-carriers used in the frequency band and that for sub-carriers not used in the frequency band.

(iii) Changing the level of allowable clipping noise in accordance with modulation methods employed for sub-carriers.

Figure 11:
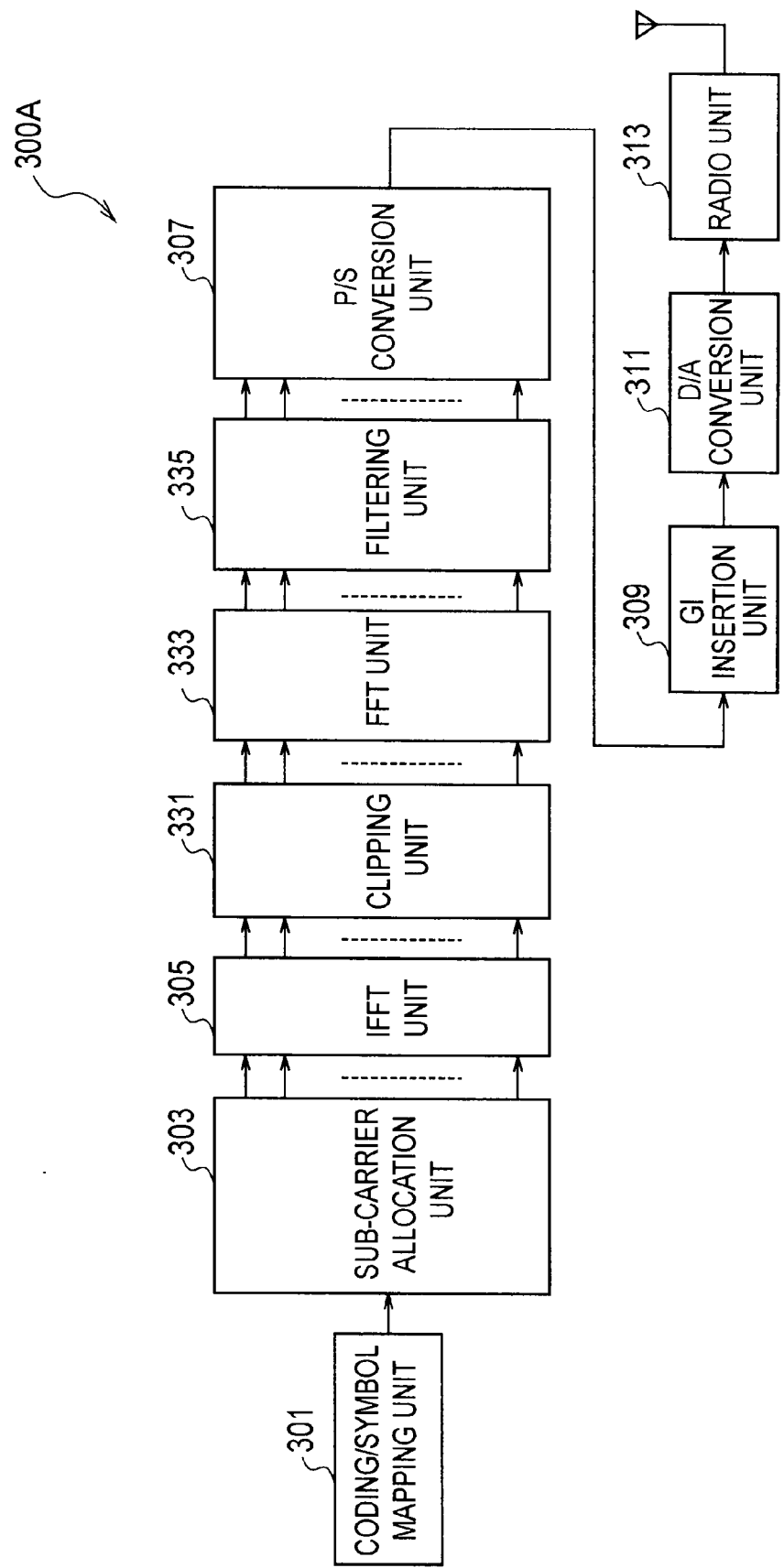
FIG. 11 is a diagram showing the configuration of functional blocks of a radio communication device 300A according to a sixth embodiment of the present invention.

FIG. 11 is a diagram showing the configuration of functional blocks of a radio communication device 300A according to this embodiment. As shown in FIG. 11, the radio communication device 300A includes a clipping unit 331, a FFT unit 333, and a filtering unit 335, as compared with the radio communication device 300 described above.

The clipping unit 331 carries out clipping processing on an OFDM signal outputted from the IFFT unit 305. To be more specific, the clipping unit 331 carries out the clipping of peak parts of an OFDM signal outputted from the IFFT unit 305, on the basis of a publicly-known method of clipping processing (for example, "Effects of clipping and filtering on the performance of OFDM," IEEE Commun. Lett., vol. 2, No. 5, pp. 131-133, May 1998).

The FFT unit 333 carries out Fourier transform on the signal outputted from the clipping unit 331. The filtering unit 335 carries out filtering on clipping noise included in the signal outputted from the FFT unit 333.

This embodiment limits sub-carriers, which are not used within the frequency band and which clipping noise overlaps with, to sub-carriers satisfying the following condition.

Specifically, sub-carriers to be used are limited to those satisfying $$f+(NM+n)\times\Delta f,$$

here, N and n represent previously-defined natural numbers, and

M represents an integer within such a range that $f+(NM+n)\times\Delta f$ falls within the band of the radio communication system 100, in the frequency bands used by the radio communication system 200 and the radio communication system 100.

Figure 12:
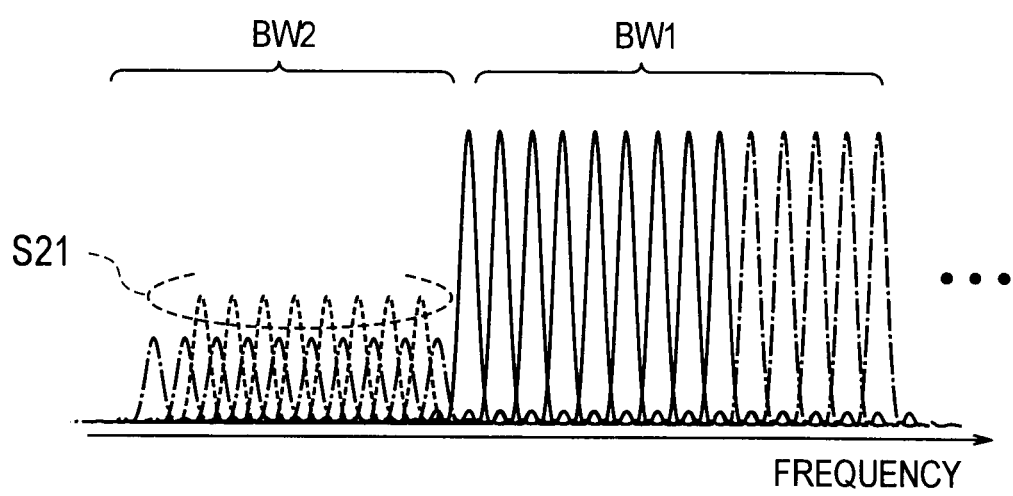
FIG. 12 is a diagram showing an example of how sub-carriers are allocated in the case where clipping noise overlaps with the sub-carriers, according to the sixth embodiment of the present invention.

FIG. 12 is an example showing how sub-carriers are allocated in the case where clipping noise overlaps with the sub-carriers. As shown in FIG. 12, when every second sub-carrier is used by the radio communication system 100 and when only the sub-carriers shown by the solid line are used, the control can be made such that clipping noise may overlap with only the sub-carriers shown by the dashed-dotted line. This prevents large interference on the sub-carriers S21 used by the radio communication system 200.

The use of the sub-carriers not satisfying the above condition results in an increase in the level of spurious waves for the sub-carriers used by the radio communication system 200 in the band BW2 adjacent to the band BW1, depending on the dynamic range of the nonlinear device and the size of peak parts to be inputted.

Note that, instead of making such setting that no clipping noise may overlap with the sub-carriers satisfying the above condition, the level of allowable clipping noise may be estimated in advance, and clipping noise may be allowed up to this level.

Other Embodiments

As described above, the details of the present invention have been disclosed by using the first to sixth embodiments of the present invention. However, it should not be understood that the description and drawings which constitute part of this disclosure limit the present invention. From this disclosure, various alternative embodiments will be easily found by those skilled in the art.

For example, the radio communication system 100 and the radio communication system 200 have employed OFDM. However, the radio communication system 100 and the radio communication system 200 do not necessarily have to employ OFDM, but have only to employ multiple sub-carriers.

The above first embodiment has been described taking as an example the case where different radio communication systems use adjacent frequency bands. Alternatively, parameters such as a spacing between sub-carriers and transmission power to be used may be determined in consideration not only of the radio communication systems using the adjacent frequency bands but also of radio communication systems using frequency bands other than the adjacent frequency bands (for example, frequency bands adjacent to the adjacent frequency bands).

The above sub-carrier allocation method may be applied to both cases where adjacent frequency bands are used by different operators and where the adjacent frequency bands are used by a single operator. The frequency bands may be ones exclusively licensed to a specific operator, or may be ones requiring no license such as ones used by a short-distance radio communication system including a radio LAN system.

The transmitter station 210 of the radio communication system 200 may perform both power control of a radio signal RS to be transmitted and a guard band adjustment, in order to reduce leakage power to an adjacent frequency band.

The above third embodiment has been described taking as an example the case where a sub-carrier usage pattern is changed on a per time-domain basis. The number of multiple time-domains divided along the time axis (time slots TS) may be three or more, and the usage rate may be zero in part of the time-domains. Further, in the radio communication system 200, a broadcast signal such as a control signal may be transmitted during the time with a usage rate of zero.

The above sixth embodiment has been described taking as an example the case where clipping and filtering is employed as a PAPR reduction method. Alternatively, other method such as PTS (Partial Transmit Sequence) may be employed.

Although the above first embodiment and the like have been described on the assumption that the radio communication system 100 is a mobile phone system and the radio communication system 200 is a broadcast system, the radio communication system 100 and the radio communication system 200 are not limited to such systems. For example, the radio communication system 200 may be a satellite communication system or a radio LAN system. Moreover, although the first embodiment and the like have been described on the assumption that the radio communication system 100 is a multi-cell radio communication system including multiple cells, the radio communication system 100 may be a single-cell radio communication system.

As described above, the present invention includes various embodiments and the like which are not described herein, as a matter of course. Therefore, a technological scope of the present invention is defined only by items specific to the invention according to claims pertinent based on the foregoing description.

Note that, the entire contents of Japanese Patent Application No. 2008-140193 (filed on May 28, 2008) are incorporated herein by reference.

INDUSTRIAL APPLICABILITY

As has been described above, the radio communication system according to the present invention is capable of effectively reducing interference with an adjacent radio communication system using an adjacent frequency band when employing a multi-carrier scheme. The radio communication system is thus advantageous in radio communication such as mobile communication.

The invention claimed is:

1. A radio communication system comprising:
a first radio communication system configured to transmit and receive a radio signal in a prescribed frequency band by using a plurality of first sub-carriers having a prescribed frequency spacing therebetween; and
a second radio communication system configured to transmit and receive a radio signal in an adjacent frequency band adjacent to the prescribed frequency band by using a plurality of second sub-carriers, wherein
the second radio communication system includes
a sub-carrier selection unit configured to select one or more of the second sub-carriers to be used in accordance with a condition of the first sub-carriers, and
a transmission unit configured to transmit the radio signal by using the second sub-carriers selected by the sub-carrier selection unit, and wherein
the sub-carrier selection unit selects the second sub-carriers located between the plurality of first sub-carriers radiated in the adjacent frequency band.

2. The radio communication system according to claim 1, wherein
the first radio communication system includes a used sub-carrier determining unit configured to use one or more of the first sub-carriers satisfying $$f+(NM+n)\times \Delta f,$$

where f represents a reference frequency in the prescribed frequency band,
$\Delta f$ represents a spacing between the first sub-carriers,
N and n each represent an integer number, and
M represents an integer within a range that $f+(NM+n)\times \Delta f$ falls within the prescribed frequency band, and
the sub-carrier selection unit selects the second sub-carriers satisfying $$f+(NM+m)\times \Delta f,$$

where m represents a positive integer other than n and smaller than N.

3. The radio communication system according to claim 2, wherein the first radio communication system and the second radio communication system employ orthogonal frequency-division multiplexing.

4. The radio communication system according to claim 3, wherein
a symbol associated with a plurality of bits is used in the first radio communication system and the second radio communication system, and
a timing for transmitting the symbol in the first radio communication system and a timing for transmitting the symbol in the second radio communication system are synchronized.

5. The radio communication system according to claim 2, wherein
N satisfies $N \geq 2$,
the sub-carrier selection unit selects sets of the second sub-carriers meeting a plurality of values of m, and
the transmission unit transmits the radio signal by using the sets of the second sub-carriers selected by the sub-carrier selection unit.

6. The radio communication system according to claim 2, wherein
a transmission frame to be transmitted in the first radio communication system is divided into a plurality of time domains along a time axis, and
in each of the first radio communication system and the second radio communication system, the value of N is different for each of the time domains.

7. The radio communication system according to claim 2, wherein
the first radio communication system includes a condition acquiring unit configured to acquire an operating condition of the second radio communication system, and
the used sub-carrier determining unit determines an integer number for N on the basis of the operating condition acquired by the condition acquiring unit.

8. The radio communication system according to claim 7, wherein the condition acquiring unit includes propagation loss between a transmitter and a receiver included in the second radio communication system.

9. The radio communication system according to claim 2, wherein the used sub-carrier determining unit determines integer numbers for N and n on the basis of a bandwidth of the prescribed frequency band used in the first radio communication system.

* * * * *